(12) United States Patent
Karaoguz et al.

(10) Patent No.: US 8,255,804 B2
(45) Date of Patent: Aug. 28, 2012

(54) RESOURCE CONTROLLED USER INTERFACE RESOURCE MANAGEMENT

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 927 days.

(21) Appl. No.: 10/874,506

(22) Filed: Jun. 23, 2004

(65) Prior Publication Data

US 2005/0065770 A1 Mar. 24, 2005

Related U.S. Application Data

(60) Provisional application No. 60/504,891, filed on Sep. 22, 2003.

(51) Int. Cl.
*G06F 15/177* (2006.01)
*G06F 15/16* (2006.01)

(52) U.S. Cl. ........ 715/737; 715/735; 715/738; 715/745; 715/747

(58) Field of Classification Search .......... 715/734–745, 715/747, 769, 773, 703; 455/442, 435.3, 455/436

See application file for complete search history.

(56) References Cited

U.S. PATENT DOCUMENTS

| | | | | |
|---|---|---|---|---|
| 5,696,903 A * | 12/1997 | Mahany | ........................ | 709/228 |
| 6,360,100 B1 * | 3/2002 | Grob et al. | .................... | 455/442 |
| 6,405,043 B1 * | 6/2002 | Jensen et al. | .................. | 455/446 |
| 6,628,965 B1 * | 9/2003 | LaRosa et al. | ................ | 455/557 |
| 6,901,429 B2 * | 5/2005 | Dowling | ........................ | 709/203 |
| 7,103,359 B1 * | 9/2006 | Heinonen et al. | ............. | 455/436 |
| 7,149,511 B1 * | 12/2006 | Bachner et al. | ............... | 455/419 |
| 7,245,937 B2 * | 7/2007 | Maari | ............................ | 455/558 |
| 7,684,483 B2 * | 3/2010 | Coleman | .................. | 375/240.01 |
| 2001/0048744 A1 * | 12/2001 | Kimura | ......................... | 380/247 |
| 2001/0054060 A1 * | 12/2001 | Fillebrown et al. | ........... | 709/201 |
| 2002/0035699 A1 * | 3/2002 | Crosbie | ......................... | 713/201 |
| 2002/0132605 A1 * | 9/2002 | Smeets et al. | ................. | 455/411 |
| 2004/0142693 A1 * | 7/2004 | Feder et al. | .................... | 455/443 |
| 2004/0171369 A1 * | 9/2004 | Little et al. | ..................... | 455/410 |

OTHER PUBLICATIONS

Definition of "Laptop". TechTerms.com [online]. TechTerms.com The Tech Terms Computer Dictionary, 2009 [retrieved on Dec. 29, 2009]. Retrieved from the Internet: <URL: http://www.techterms.com/definition/laptop>.*

\* cited by examiner

*Primary Examiner* — Nicholas Augustine
(74) *Attorney, Agent, or Firm* — Brinks Hofer Gilson & Lione (57) ABSTRACT

A system and method for managing the allocation and utilization of user interface resources in a communication system. Various aspects of the present invention comprise establishing a wireless communication link between a user interface resource and a system with which the user interface resource may be used. It may be determined that at least a portion of the user interface resource may be used with the system. Various aspects of the present invention may communicate that at least a portion of the user interface resource may be used with the system. A request may be made that at least a portion of the user interface resource be allocated for use with the system. The allocation request may be received, and at least a portion of the user interface resource may be allocated for use with the system. The allocated user interface resource may be utilized with the system.

23 Claims, 7 Drawing Sheets

RESOURCE CONTROLLED USER INTERFACE RESOURCE MANAGEMENT

CROSS-REFERENCE TO RELATED APPLICATIONS/INCORPORATION BY REFERENCE

This patent application is related to and claims priority from provisional patent application Ser. No. 60/504,891 filed Sep. 22, 2003, and titled "RESOURCE BASED USER INTERFACE RESOURCE SHARING," the contents of which are hereby incorporated herein by reference in their entirety. This patent application is related to U.S. patent application Ser. No. 10/874,430, filed Jun. 23, 2004 and titled "CENTRAL SYSTEM BASED USER INTERFACE RESOURCE MANAGEMENT"; and U.S. patent application Ser. No. 10/874,426, filed Jun. 23, 2004 and titled "HOST ARBITRATED USER INTERFACE RESOURCE SHARING".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, for example a wireless communication network, where resources may serve and be served by a dynamically changing group of other resources, the environment should include a system and method for managing user interface resources.

Present systems to not provide a user friendly and efficient mechanism for managing user interface resources in a dynamic network environment. Present systems may be deficient in a variety of ways. For example and without limitation, a user may be required to perform an inconvenient array of set-up procedures to utilize a particular user interface resource with a particular system. Such set-up procedures may include, for example, physically altering system connections and/or manually specifying communication link parameters. The user may, for example, have to perform such set-up procedures on numerous systems.

Also for example, a user may have to perform various inconvenient set-up procedures when the user desires to switch systems with which the user is utilizing a particular user interface resource. Such set-up procedures may include, for example, performing manual operations to tear down and establish communication links between the user interface resource and the old and new systems. The user may, for example, have to perform such set-up procedures on a multitude of systems, which may even include, for example, the system with which the user no longer desires to utilize the user interface resource.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for managing the allocation and utilization of user interface resources in a communication system. Various aspects of the present invention comprise establishing a wireless communication link between a user interface resource and a system with which the user interface resource may be used. Such a communication link may be implemented, for example, utilizing respective communication modules in the user interface resource and the system.

Various aspects of the present invention may determine that at least a portion of the user interface resource may be used with the system. Such determination may, for example, comprise determinations of authorization, communication capabilities, and information processing capabilities. Such determination may, for example, be performed, at least in part, by a user interface resource management module in the user interface resource. The user interface resource management module may, for example, utilize an authorization module and communication module to make various determinations.

Various aspects of the present invention may communicate that at least a portion of the user interface resource may be used with the system. For example, such communication may comprise at least one of the user interface resource and the system providing information to a user in human-perceivable form. Such communication may alternatively, for example, comprise communicating a signal between the user interface resource and the system. Such communication may, for example, be performed, at least in part, by a user interface management module of the user interface resource. The user interface management module may, for example, utilize at least one of a user output module and a communication module for such communication.

Various aspects of the present invention may comprise requesting that at least a portion of the user interface resource be allocated for use with the system. Such a request may, for example, be made by a user or a system. For example, a user may make a user interface resource allocation request using a user input module of the user interface resource or the system. Such a request may also, for example, be communicated between respective communication modules of the user interface resource and the system.

Various aspects of the present invention may comprise receiving the user interface resource allocation request. The allocation request may then be received from a user or a system. For example, a user interface management module in the user interface resource may receive such a request from a user input module of the user interface resource. Alternatively, for example, the user interface management module may receive such a request from the system via a communication module.

Various aspects of the present invention may comprise utilizing at least a portion of the user interface resource allocated for use with the system. Such utilization may comprise, for example, establishing and maintaining communication links, translating data formats, and generally processing information communicated between the user interface resource and the system. Such utilization may be accomplished using various modules of the user interface resource and the system.

These and other advantages, aspects and novel features of the present invention, as well as details of illustrative aspects thereof, will be more fully understood from the following description and drawings.

DETAILED DESCRIPTION OF THE INVENTION

Figure 1:
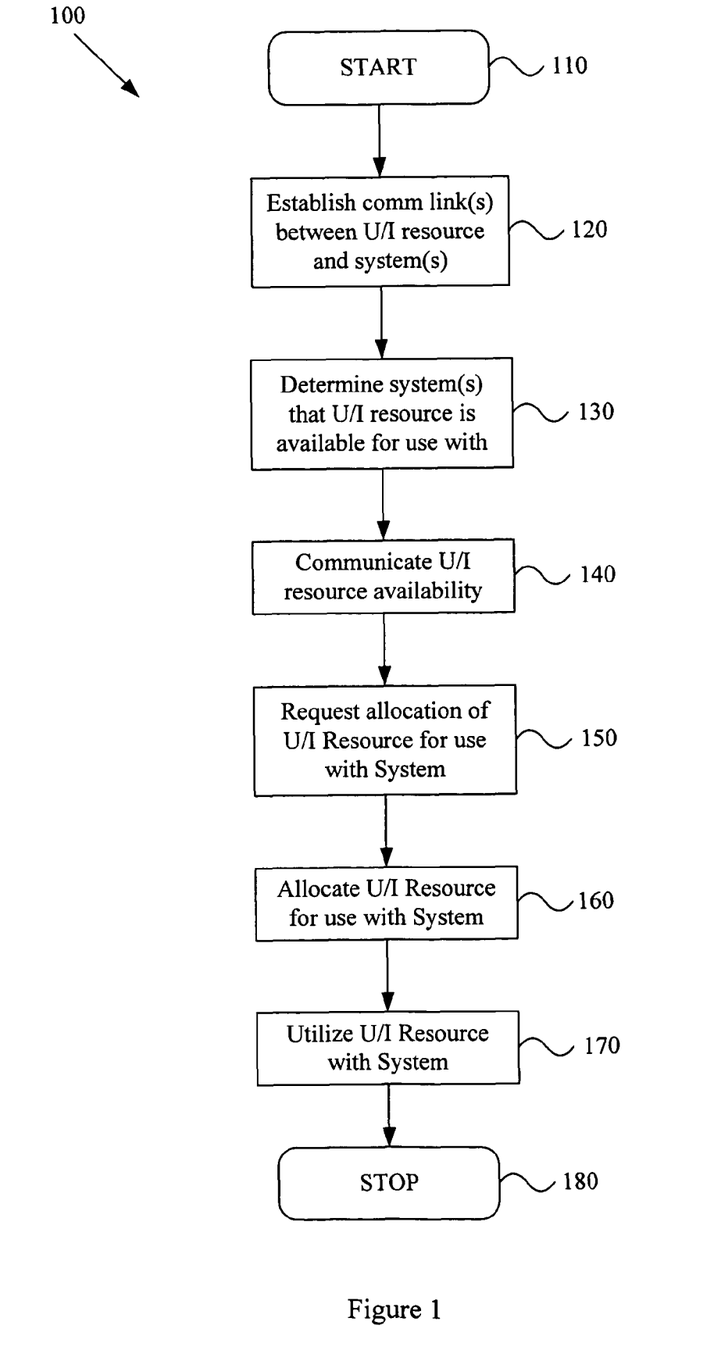
FIG. 1 is a flow diagram illustrating a method for managing one or more user interface resources, in accordance with various aspects of the present invention.

FIG. 1 is a flow diagram illustrating a method 100 for managing one or more user interface resources, in accordance with various aspects of the present invention. The method begins at step 110. Various events and conditions may cause the method 100 to begin. For example, a wireless resource may enter the boundaries of a wireless communication network. Such an event may occur, for example, when a user carries a portable user interface (U/I) resource into the boundaries of a wireless communication network. Such boundaries may be defined according to wireless signal quality, noise conditions, geographical boundaries, or any of a variety of conditions and characteristics that may define the boundaries of a wireless communication network. Alternatively, for example, a user may power-up a U/I resource or other device in a wireless communication network. Also, for example, a U/I resource or other device may exit from a sleep state. In addition, for example, a user may explicitly force the method 100 to begin by, for example, entering a command at the U/I resource or other device. The method 100 may be initiated in a large variety of ways. Accordingly, the scope of various aspects of the present invention should not be limited by characteristics of particular events and conditions that cause the method 100 to begin.

The U/I resource may comprise a wide variety of devices. Such devices may comprise, for example and without limitation, a mouse, trackball, thumbwheel, touch screen, touch pad, voice recognition system, voice synthesis system, laser scanning system, printer, scanner, keyboard, audio output device, audio input device, video output device, video input device, pager, telephone, cell phone or remote control device. In general, the U/I resource may comprise any device, or portion thereof, through which a user and a system may communicate, comprising input devices and output devices. Accordingly, the scope of various aspects of the present invention should not be limited by characteristics of particular U/I resources.

The method 100, at step 120, comprises establishing a wireless communication link between the U/I resource and another system in the communication network. The system may comprise, for example and without limitation, a computing system, video or audio entertainment system, security system, environmental control system, communication system, home appliance, or any other system that may be advantageously communicatively coupled to a user interface resource. Accordingly, the scope of various aspects of the present invention should not be limited by characteristics of a particular system that may be communicatively coupled to a U/I resource.

Step 120 may, for example, comprise establishing a wireless communication link between the U/I resource and the system using any of a variety of wireless communication protocols. Such a protocol may be non-standard, such as a supplier's proprietary interface protocol, or standard, such as, for example, IEEE 802.11, IEEE 802.15, Bluetooth and ultra wideband (UWB) protocols. The communication link may, for example, be a contention-free communication channel or a contention-based communication channel. The communication medium may, for example, be a radio frequency (RF) medium or an optical medium. Accordingly, the scope of various aspects of the present invention should not be limited in any way by characteristics of particular communication protocols, media, channels or links.

Note that step 120 may also comprise, for example, establishing respective communication links with a plurality of systems. For example, in a scenario where the U/I resource is within range of multiple systems, the U/I resource may establish a communication link with each of the multiple systems. The following discussion will generally address the single-system case. However, the single-system case is merely illustrative, and various aspects of the present invention are readily extensible to a multi-system environment.

The method 100, at step 130, comprises determining whether the system and the U/I resource are available for, and/or capable of, use with each other. The system and the U/I resource may, for example, perform a variety of authorization/authentication functions. The U/I resource and the system may, for example, communicate over the communication link formed in step 120 to determine whether the U/I resource, or user thereof, and the system are authorized for use with each other. For example, the U/I resource and/or system may communicate and analyze authorization codes. Additionally, for example, the U/I resource and/or system may have the capability to acquire information from a user to analyze in determining whether a user is authorized to use the U/I resource, system, or combination thereof. Such information may comprise, for example, thumbprint, retinal scan, card scan, ID code, or facial scan information.

Further, step 130 may, for example, comprise determining various communication and information processing capabilities of the U/I resource and the system. Such capabilities may comprise, for example, information type, information translation, data rate, data format, data encoding/decoding, and secure communication capabilities. For example, in an exemplary scenario where the U/I resource is an audio output device and the system has no audio output capability, the U/I resource and/or the system may determine that the system and U/I resource are not available for use with each other. Additionally, for example, in a scenario where the U/I resource is a video output device only capable of receiving and processing MPEG-4 video information and the system is only capable of outputting MPEG-2 video information, the U/I resource and/or the system may determine that the system and U/I resource are not available for use with each other. Also, for example, the U/I resource and/or the system may determine that the U/I resource and system cannot communicate with each other at an appropriate level of security.

In general, the U/I resource and the system may ascertain and analyze a large number of compatibility characteristics to determine whether use of the U/I resource with the system is appropriate. Accordingly, the scope of various aspects of the present invention should not be limited by characteristics of particular compatibility determinations.

Note that step 130 may comprise determining the availability of the U/I resource for use with a plurality of systems. For example, where the U/I resource established communication links in step 120 with multiple systems, step 130 may comprise determining the availability of each of the U/I resources for use with multiple systems. In an exemplary scenario where a user enters an office carrying a keyboard U/I resource, where the office comprises a desktop computing station, laptop computing station, and portable email device, the keyboard U/I resource and the various office systems may determine whether the keyboard U/I resource is available for use with each of the various office systems.

The method, at step 140, comprises communicating the availability of the U/I resource for use with the system (or vice versa). At this point, such communication may or may not, for example, be in the form of a human-perceivable signal. For example, the U/I resource may communicate on an output display of the U/I resource the availability of the U/I resource for use with the system. The U/I resource may, for example, indicate that the U/I resource is available for use with the system by presenting an icon representing the system on an output display. The U/I resource may, for example, indicate that the U/I resource is available for use with the system by displaying a textual list to a user. The user of the U/I resource may then view information of the availability of the U/I resource for use with the system on the video display of the U/I resource.

Alternatively, for example, the U/I resource may communicate information of the availability of the U/I resource for use with the system over the communication link to the system. The system may then provide such information to a user of the system in human-perceivable form. The system may communicate such information to the user in a variety of ways. For example, the system may provide a textual or graphical indication on a video display coupled to the system or an audible indication on an audio output device coupled to the system. In general, step 140 comprises communicating the availability of the U/I resource for use with the system. Accordingly, the scope of various aspects of the present invention should not be limited by the manner in which the availability of the system for use with the U/I resource is communicated.

Further, as mentioned previously, step 120 may have, for example, established communication links with a plurality of systems. Also, step 130 may have, for example, determined that the U/I resource is available for use with a plurality of systems. In such a scenario, step 140 may, for example, comprise communicating that the U/I resource is available for use with the plurality of systems determined in step 130.

The method 100, at step 150, comprises requesting allocation of at least a portion of the U/I resource for use with the system. Such requesting may be performed in a variety of ways. For example and without limitation, a user may request the allocation using the U/I resource or using the system or an input device coupled thereto. A user may, for example, make such a request by selecting a graphical or textual indication on an output display of the U/I resource. Alternatively, for example, a user may make such a request by selecting a graphical or textual indication on an output display coupled to the system. The system may then, for example, communicate information of the allocation request to the U/I resource.

A U/I resource request may, for example, take the form of a signal communicated between systems. For example, the system may automatically, or in response to a user input, request allocation of the U/I resource for use with the system. For example, the system may, in response to a user selection of an available resource indication, communicate a request to the U/I resource for allocation of the U/I resource for use with the system. Also, for example, a module of the U/I resource may be waiting for an indication of the availability of a system with which to use the U/I resource, and upon receipt of such an indication, automatically request allocation of the U/I resource to use with the system. Additionally, for example, the system may be waiting for an indication of the availability of the U/I resource to use with the system, and upon receipt of such an indication, automatically request allocation of the U/I resource for use with the system.

A request for U/I resource allocation for use with the system may be for allocation of the entire U/I resource or a portion thereof. Various U/I resources may be properly allocated for use with only one system at a time, and other U/I resources may be properly allocated for use with multiple systems simultaneously. For example, the request may be for allocating an entire keyboard U/I resource or an entire audio output U/I resource. Also, for example, the request may be for allocating a single window or portion of a video output U/I resource, or an entire audio output or single output channel of an audio output U/I resource.

In general, a request for allocation of the U/I resource to use with the system may comprise a large number of various characteristics. Accordingly, the scope of various aspects of the present invention should not be limited to characteristics of a particular form or method of requesting U/I resource allocation.

The method 100, at step 160, comprises allocating at least a portion of the U/I resource for use with the system. The U/I resource may, for example, after receiving an allocation request in step 150, allocate at least a portion of the U/I resource for use with the system. In an exemplary scenario of a keyboard U/I resource and a desktop computing system, the U/I resource may allocate the entire U/I resource for use with the desktop computing system. In another exemplary scenario of a video display U/I resource, DVD player system and laptop computer system, the U/I resource may allocate a first window or frame portion of the U/I resource for use with the DVD player system and a second window or frame portion of the U/I resource for use with the laptop computer system.

Step 160 may comprise, for example, communicating the U/I resource allocation to a user in a human perceivable form or communicating a signal indicating the U/I resource allocation to the system. In an exemplary scenario where step 160 comprises communicating a signal indicating the U/I resource allocation to the system, the system may, for example, provide a human-perceivable indication that the U/I resource has been allocated for use with the system.

When presenting a user with an indication of the U/I resource allocation, the U/I resource or system may, for example, provide a graphical or textual indication on a video display device, or may provide an audible or physical indication. The U/I resource or system may provide the allocation indication in a large variety of manners. Accordingly, the scope of various aspects of the present invention should not be limited by characteristics of particular manners of providing human-perceivable information to a user.

Step 160 may also comprise, for example, maintaining a database of systems with which the U/I resource is available or capable of use and how the U/I resource is allocated to the systems. For example, the second system may maintain a database that lists each system along with how the U/I resource is allocated.

In an exemplary scenario, a keyboard U/I resource may maintain a database that lists a desktop computing system, laptop computing system and portable email device as systems with which the keyboard U/I resource may be used. The keyboard U/I device may then, for example, indicate in the database that the keyboard U/I resource is presently allocated for use with the portable email device. In an alternative exemplary scenario, a video display U/I resource may maintain a database that lists a DVD player, laptop computing system, television receiver and personal digital assistant as systems with which the video display U/I resource may be used. The video display U/I resource may then, for example, indicate that one window or frame of the video display U/I resource has been allocated for use with the DVD player, and another window or frame of the video display U/I resource has been allocated for use with the portable email device.

In general, step 160 comprises allocating at least a portion of the U/I resource for use with at least a portion of the system. Accordingly, the scope of various aspects of the present invention should not be limited by characteristics of any particular method of allocation or communication thereof.

The method 100, at step 170, comprises utilizing the allocated U/I resource with the system(s) that step 160 allocated the U/I resource for use with. Such utilization may comprise, for example, performing various initialization steps. For example, step 170 may comprise establishing communication links between systems to provide for the desired data transfer rate between devices. For example, step 170 may comprise establishing any of a variety of communication links between the U/I resource and the system.

Such links may be nonstandard links or standard links. For example, such links may be governed by propriety communication protocols or standard communication protocols (e.g., IEEE 802.11, IEEE 802.15, Bluetooth and UWB). Such links may, for example, be contention-free or contention-based links. Step 170 may also comprise, for example, initializing the systems for encryption and decryption of information transferred between the systems. Such initialization may comprise, for example, exchanging encryption capability information and exchanging public keys. Additionally, the communication links may utilize various communication media, for example, wireless RF and optical media. Accordingly, the scope of various aspects of the present invention should by no means be limited by characteristics of particular communication links, media or linking protocols.

Step 170 may comprise maintaining communication links between devices during use of the U/I resource(s). For example, step 170 may comprise maintaining an MPEG communication link between the system and the U/I resource, through which the system and U/I resource may communicate MPEG motion picture information. Also for example, step 170 may comprise maintaining an audio data-streaming link between the system and U/I resource through which the system and U/I resource may communicate audio information. Step 170 may generally comprise performing any and all necessary functions to maintain the communication links between the U/I resource and the system. Accordingly, the scope of various aspects of the present invention should not be limited by characteristics of particular communication link maintenance and utilization activities.

Also, for example, step 170 may comprise performing encryption and decryption of information communicated between the U/I resource and the system. For example, step 170 may comprise the U/I resource encrypting information prior to communicating such information to a system. Step 170 may then also, for example, comprise the receiving system decrypting the encrypted information after receipt of the encrypted information. Step 170 may also comprise, for example, translating information between formats that are compatible with the U/I resource and the system. Step 170 may generally comprise performing any of a large variety of information transformation operations. Accordingly, various aspects of the present invention should by no means be limited by characteristics of particular information transformation procedures or techniques.

The method 100, at step 180, comprises ending execution of the method 100. Such ending may be initiated or triggered by a variety of events and conditions. For example and without limitation, a user may explicitly indicate to the U/I resource or system that the user no longer desires to use the U/I resource with the system. Also, for example, the U/I resource or system may set a time limit for use of the U/I resource with the system. Such time limit may comprise a time-of-use limit, or may alternatively, for example, comprise a time limit on inactivity. Additionally, for example, a power-down event or the U/I resource or system exiting the communication network may trigger step 180. In general, any of a large number of events may trigger the end of the method 100. Accordingly, the scope of various aspects of the present invention should not be limited to characteristics of particular events that may cause the method 100 to end.

Step 180 may also comprise, for example, clean-up processing upon ending use of the U/I resource with the system. For example, step 180 may comprise performing processing and communication for de-allocating the U/I resource for use with the system. In one exemplary scenario, step 180 may comprise the U/I resource maintaining a database to indicate that the U/I resource is no longer allocated for use with the system. Step 180 may, for example, comprise tearing down communication links that were established for communication between the U/I resource and system and de-allocating the associated communication bandwidth. Step 180 may, for example, comprise re-allocating the U/I resource for use with a second system. Step 180 may in general comprise performing a large variety of clean-up functions. Accordingly, the scope of various aspects of the present invention should not be limited by characteristics of particular clean-up functions and procedures.

Figure 2:
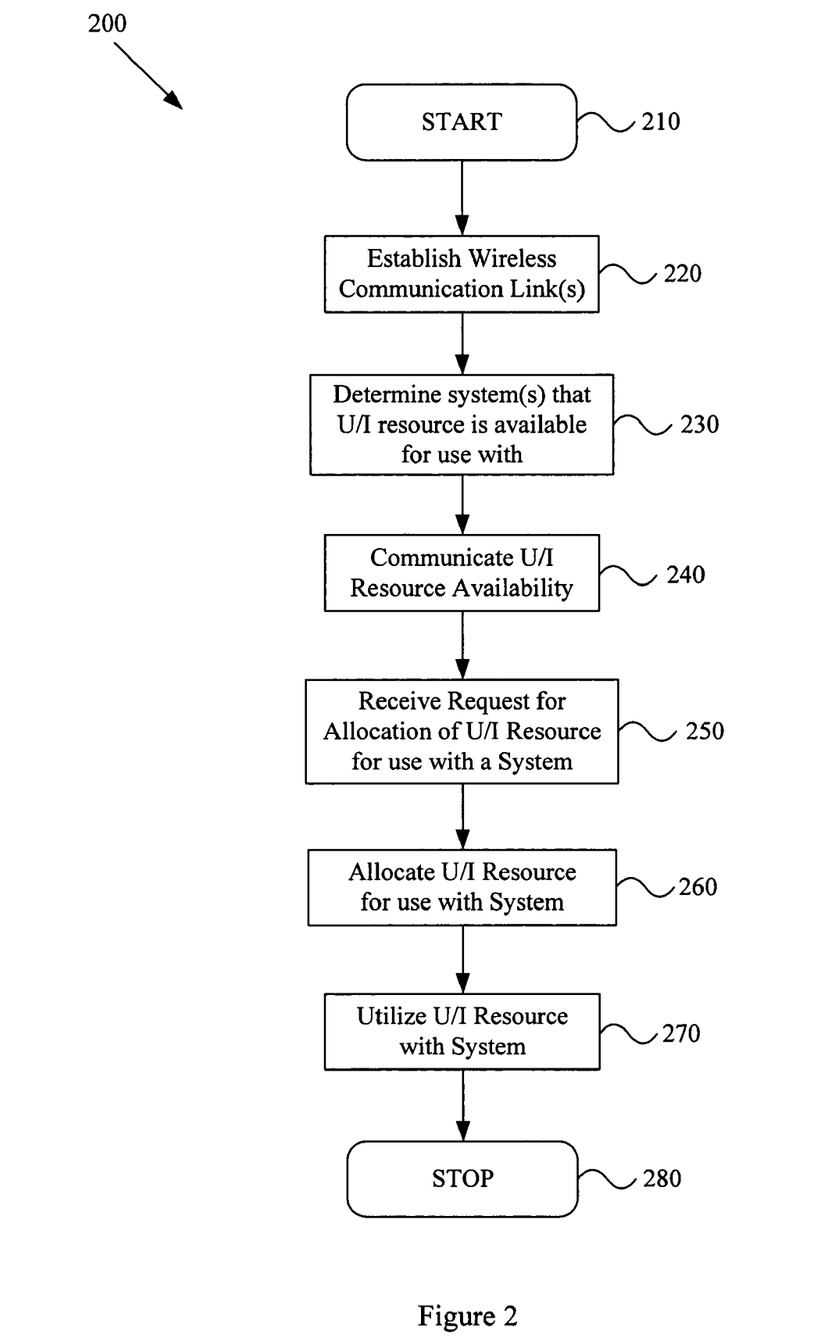
FIG. 2 is a flow diagram illustrating a method for managing an exemplary user interface resource, in accordance with various aspects of the present invention.

The exemplary method 100 illustrated in FIG. 1 illustrates a portion of various aspects of the present invention. FIG. 2 provides a second exemplary method 200 to illustrate further aspects of the present invention and to further illustrate at least a portion of the various aspects introduced by FIG. 1 and the previous discussion.

FIG. 2 is a flow diagram illustrating a method 200 for managing a user interface resource in accordance with various aspects of the present invention. FIG. 2 will be discussed in the context of an exemplary U/I resource management scenario. The details of the exemplary scenario are merely illustrative and should by no means limit the scope of various aspects of the present invention.

The method 200 begins at step 210. As discussed previously with regard to step 110 of the exemplary method 100 illustrated in FIG. 1, step 210 may be triggered or initiated by a wide array of events and conditions. For the present example, the U/I resource is a video display device that a user turns on in a family room, the dimensions of which define the boundaries of a wireless communication network. Also, for the present example, the communication environment comprises three systems in addition to the U/I resource. The first system is a DVD system, the second system is a desktop computing system, and the third system is a portable email device. Each of the systems is operating in the exemplary communication environment that the U/I resource has just joined. The U/I resource and systems may, for example, through the use of a wireless network communication protocol, detect the presence of the other systems and initiate communication activity.

The method 200, at step 220, comprises the U/I resource and the systems, establishing respective wireless communication links. Various exemplary aspects of establishing communication links were discussed previously with regard to step 120 of the method 100 illustrated in FIG. 1. In the exemplary scenario, The U/I resource may detect a beacon signal from each of the three exemplary systems and attempt to establish a respective communication link with each system. The U/I resource and the exemplary systems may then establish communication links over which the U/I resource and exemplary systems may communicate. In the exemplary scenario, the U/I resource establishes contention-free communication links with the DVD system and the desktop computing system, and utilizes a contention-based communication protocol to communicate with the portable email device.

Figure 4:
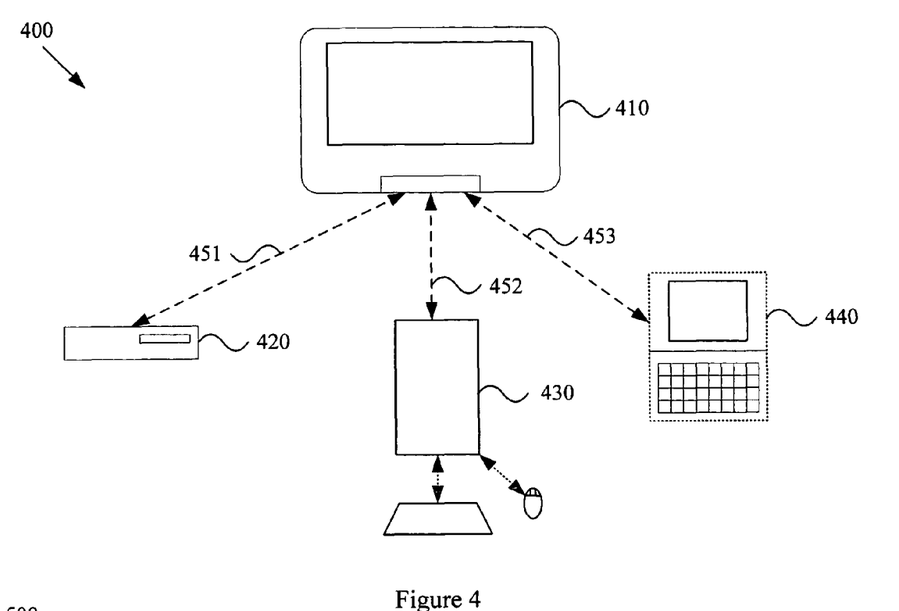
FIG. 4 is a diagram showing an exemplary user interface resource management environment in accordance with various aspects of the present invention.

FIG. 4 is a diagram illustrating the exemplary communication environment 400. The exemplary environment 400 comprises the video display U/I resource 410, DVD system 420, desktop computing system 430 and personal email device 440. The exemplary video display U/I resource 410 has established respective communication links 451-453 with each of the exemplary systems 420-440.

Referring back to FIG. 2, the method 200, at step 230, comprises determining U/I resource availability. That is, step 230 determines whether the U/I resource is available for use with the systems that the U/I resource established communication links with in step 220. Such an availability determination was generally discussed with regard to step 130 in FIG. 1. In general, such an availability determination may comprise a variety of sub-determinations, comprising but not limited to, authorization/authentication determination, communication and processing capability determination, and current use determination.

In the exemplary scenario, the video display U/I resource may, for example, perform step 230 and determine that the video display U/I resource and the DVD system are authorized for use with each other and have the requisite communication and signal processing capabilities. Additionally, for example, the video display U/I resource may determine that the desktop computing station is compatible with the video display U/I resource. Further, for example, the video display U/I resource may determine that the portable email device and the video display U/I resource are authorized for use with each other, have a required level of secure communication functionality, and have the capability to communicate using a common wireless protocol. Accordingly, the exemplary video display UI resource may determine that the U/I resource is available for use, consecutively or concurrently, with each of the three exemplary systems.

The exemplary method 200, at step 240, comprises communicating an indication of the systems with which the U/I resource may be utilized. System availability communication was generally discussed previously with regard to step 140 of the method 100 shown in FIG. 1.

Figure 5:
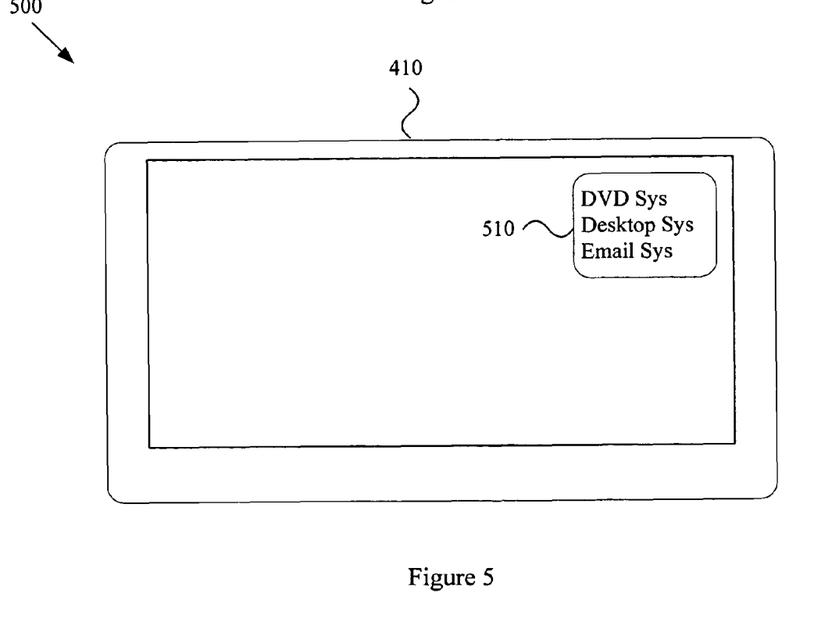
FIG. 5 is a diagram showing an exemplary video display user interface resource in accordance with various aspects of the present invention.

In the exemplary scenario, the video display U/I resource communicates the system availability to a user by using a portion of its video display. FIG. 5 shows a portion of the exemplary environment 500. The exemplary display U/I resource 410 is communicating the system availability information to a user in human-perceivable form. The exemplary display U/I resource 410 provides a textual menu output 510 that indicates to a user of the display U/I resource 410 the systems with which the video display U/I resource 410 may be used.

The exemplary method 200, at step 250, comprises receiving a request for allocation of the U/I resource for use with a system. Requesting allocation of the U/I resource for use with a system was generally discussed previously with regard to step 150 of the method 100 shown in FIG. 1.

In the exemplary scenario, the user may, for example, utilize an input device communicatively coupled to the video display U/I resource to select one or more of the system indications provided to the user in step 240. For example, referring to FIG. 5, a user of the exemplary video display U/I resource 410 may select the DVD system indicated on the textual menu output 510.

The exemplary method 200, at step 260, comprises allocating the U/I resource for use with the requested system(s). U/I resource allocation was generally discussed previously with regard to step 160 of the method 100 shown in FIG. 1.

In the exemplary scenario, the U/I resource allocates the U/I resource to be used with the requested system. That is, processing within the video display U/I resource allocates the video display U/I resource to be used with the DVD system.

Figure 6:
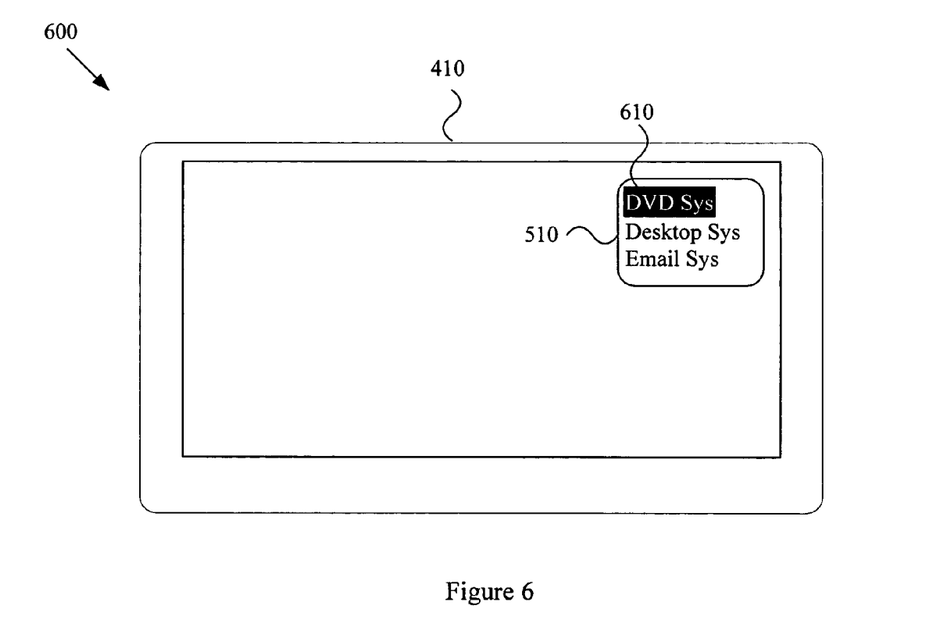
FIG. 6 is a diagram showing an exemplary video display user interface resource in accordance with various aspects of the present invention.

Step 260 may also comprise, for example, communicating the U/I resource allocation. With reference to FIG. 6, in the exemplary scenario, the video display U/I resource 410 communicates the resource allocation to the user by highlighting the DVD textual indication 610 on the menu 510.

Referring back to FIG. 2, step 260 may also comprise, for example, maintaining a database that comprises information indicative of the allocation of the U/I resource. In the exemplary scenario, the video display U/I resource comprises a memory that stores information related to each of the systems that step 230 determined the video display U/I resource was available for use with, comprising the DVD system, desktop computing system, and portable email system. In the exemplary scenario, the video display U/I resource modifies the database to indicate that the video display U/I resource is currently allocated for use with the DVD system.

The exemplary method 200, at step 270, comprises utilizing the U/I resource with the system(s) that step 260 allocated the U/I resource for use with. Utilizing the U/I resource was generally discussed previously with regard to step 170 of the method shown in FIG. 1.

In the exemplary scenario, the video display U/I resource and the DVD system establish communication links for communicating MPEG-2 information. The video display U/I resource receives MPEG-2 motion picture information from the DVD system. During use, the video display U/I resource and the DVD system maintain an MPEG-2 communication stream between them. The video display U/I resource receives moving picture information from the DVD system in MPEG-2 format, transforms the MPEG-2 information into a format more conducive to driving a video display, and presents the communicated motion picture information to a user in a human-perceivable form.

The exemplary method 200, at step 280, comprises stopping use of the U/I resource with the system(s) that step 260 allocated the U/I resource for use with. Stopping use of the U/I resource was generally discussed previously with regard to step 180 of the method 100 illustrated in FIG. 1.

In the exemplary scenario, the user of the video display U/I resource decides to discontinue using the video display U/I resource with the DVD system. In the exemplary scenario, the user displays the list of systems (as illustrated by item 510 of FIG. 6) and de-selects the textual indication corresponding to the DVD system.

Continuing the exemplary scenario, after the user de-selects the DVD system, the video display U/I resource performs clean-up processing with regard to the utilization of the U/I resource with the DVD system. For example, the exemplary video display U/I resource tears down the communication links that were utilized earlier for communicating motion picture information. Note that the video display U/I resource may also still maintain a communication link with the DVD system, such as, for example, the communication link established in step 220. Additionally, the exemplary video display U/I resource modifies internal memory to indicate that the U/I resource is no longer allocated for use with the DVD system.

As mentioned previously, FIG. 2 illustrates an exemplary method 200 to illustrate a subset of various aspects of the present invention as utilized in a particular exemplary scenario. The exemplary method 200 was shown and discussed for illustrative purposes, and accordingly, the details of the exemplary illustration should by no means limit the scope of various aspects of the present invention.

Figure 3:
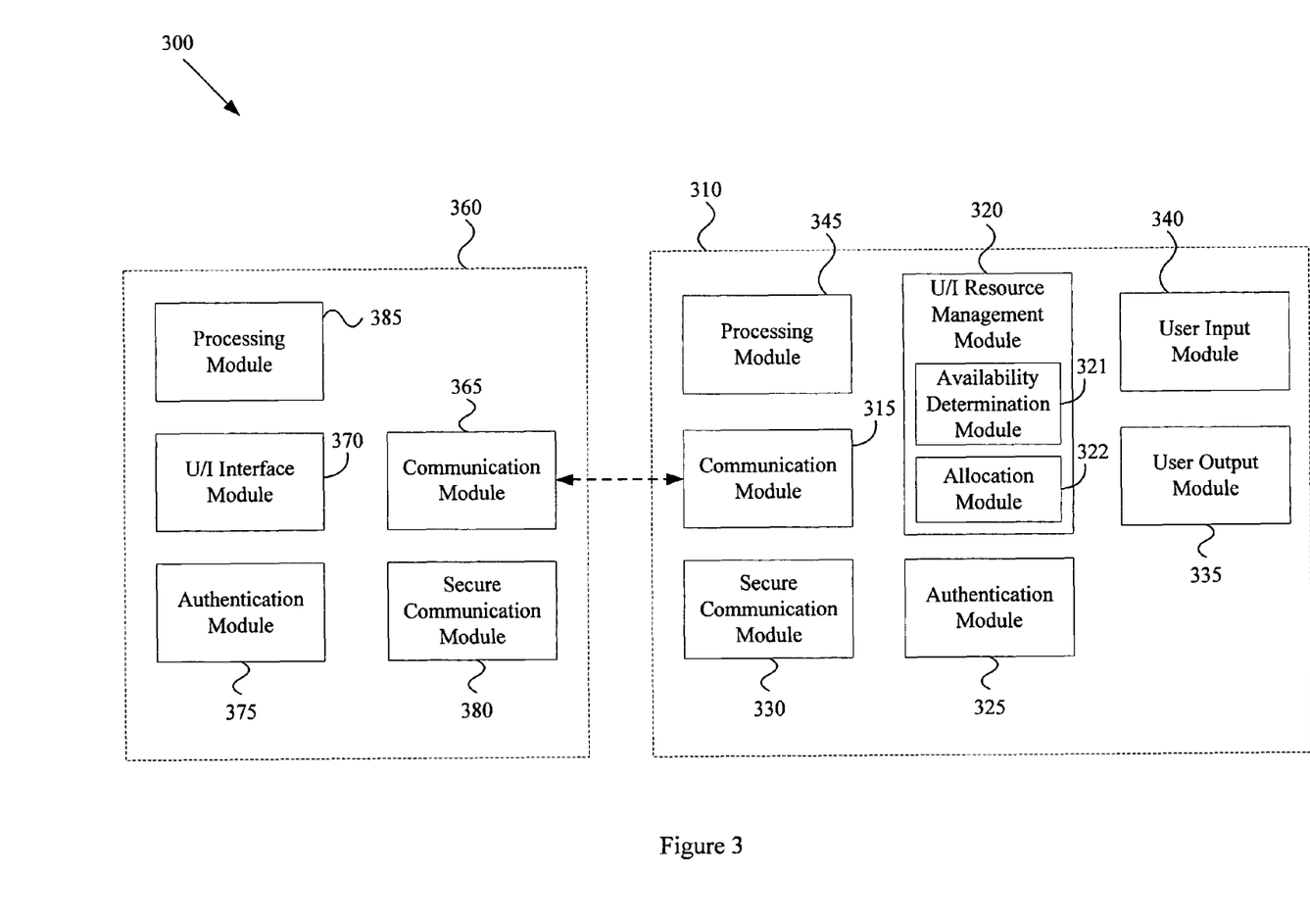
FIG. 3 is a diagram illustrating a system for managing a user interface resource, in accordance with various aspects of the present invention.

FIG. 3 is a diagram illustrating a system 300 for managing a user interface resource, in accordance with various aspects of the present invention. The system 300 and various components of the system 300 may, for example, implement various aspects of the present invention as discussed previously with regard to the methods 100, 200 illustrated in FIGS. 1 and 2. Note, however, that the structure and operation of the various components of the system 300 should not be limited to structure performing the various aspects of the present invention as discussed previously with regard to the methods 100, 200 illustrated in FIGS. 1 and 2.

The exemplary system 300 comprises an exemplary U/I resource 310 and a system 360. The U/I resource 310 may also be referred to in the following discussion as a "user interface system." The U/I resource 310 may comprise, for example, a communication module 315, U/I resource management module 320, authentication module 325, secure communication module 330, user output module 335, user input module 340 and processing module 345.

The U/I resource 310 may comprise a wide variety of devices. Such devices may comprise, for example and without limitation, a mouse, trackball, thumbwheel, touch screen, touch pad, voice recognition system, voice synthesis system, laser scanning system, printer, scanner, keyboard, audio output device, audio input device, video output device, video input device, pager, telephone, cell phone or remote control device. In general, the U/I resource 310 may comprise any device through which a user and a system may communicate, comprising input devices and output devices. Accordingly, the scope of various aspects of the present invention should not be limited by characteristics of particular U/I resources.

The system 360 may comprise, for example, a communication module 365, U/I interface module 370, authentication module 375, secure communication module 380 and processing module 385. The system 360 may, for example, represent a system with which the U/I resource 310 may be utilized.

The system 360 may comprise, for example and without limitation, a computing system, video or audio entertainment system, security system, environmental control system, communication system, home appliance, or any other system with which the U/I resource 310 may be utilized. Accordingly, the scope of various aspects of the present invention should not be limited by characteristics of a particular system that may be communicatively coupled to a U/I resource.

The U/I resource 310 may comprise, for example, a communication module 315. The communication module 315 may establish and maintain communication links between the U/I resource 310 and one or more other systems. For example, the communication module 315 may establish and maintain one or more communication links between the U/I resource 310 and the system 360 (e.g., with the communication module 365 of the system 360). The communication module 315 may be utilized, for example, to implement various operations as discussed previously with regard to the methods 100, 200 illustrated in FIGS. 1 and 2.

The U/I resource 310 may comprise, for example, a U/I resource management module 320. The U/I resource management module 320 may, for example, utilize the communication module 315 to communicate with other systems (e.g., the system 360). The U/I resource management module 320 may comprise various sub-modules. For example and without limitation, the U/I resource management module 320 may comprise an availability determination module 321 and an allocation module 322.

The availability determination module 321 may, for example, determine whether at least a portion of the U/I resource 310 may be used with one or more systems (e.g., the system 360) that are communicatively coupled to the U/I resource 310. The availability determination module 321 may, for example, implement various aspects of the methods 100, 200 illustrated in FIGS. 1 and 2 (e.g., steps 130 and 230). For example and without limitation, the availability determination module 321 may perform a variety of authorization/authentication operations. For example, the availability determination module 321 may utilize the authentication module 325 to determine whether the U/I resource 310 and the system 360 are authorized for use with each other. The authentication module 375 of the system 360 may also, for example, play a role in the authentication determination. Additionally, the availability determination module 321 may determine and assess a large variety of communication and information processing capabilities of the U/I resource 310 and the system 360.

The availability determination module 321 may also, for example, communicate the system(s) with which the U/I resource 310 may be used. The availability determination module 321 may, for example, implement various aspects of the method 100, 200 illustrated in FIGS. 1 and 2 (e.g., steps 140 and 240). For example and without limitation, the availability determination module 321 may utilize the user output module 335 to communicate U/I resource availability information to a user in human-perceivable form. Also, for example, the availability determination module 321 may utilize the communication module 315 to communicate U/I resource availability information to the system 360. The system 360 may, for example, communicate the system availability information to a user in human-perceivable form or may respond to such information automatically.

The allocation module 322, for example, may receive a request to allocate at least a portion of the U/I resource 310 for use with one or more systems. The allocation module 322 may, for example, implement various aspects of the method 100, 200 illustrated in FIGS. 1 and 2 (e.g., steps 150 and 250).

The allocation module 322 may, for example, receive an allocation request from the user input module 340. For example, a user may select a system with which to use the U/I resource 310 from information output to the user by the availability determination module 321. Alternatively, for example, a user may utilize the system 360 to request a system with which to use the U/I resource 310. The system 360 may then, for example, utilize the system 360 communication module 365 to communicate the allocation request to the communication module 315 of the U/I resource 310 and ultimately to the allocation module 322.

The allocation module 322 may, for example, allocate at least a portion of the U/I resource 310 for use with the one or more requested systems. The allocation module 322 may, for example, implement various aspects of the method 100, 200 illustrated in FIGS. 1 and 2 (e.g., steps 160 and 260). The allocation module 322 may then, for example, utilize the user output module 335 to communicate information of the U/I resource allocation to a user in human-perceivable form. Alternatively, for example, the allocation module 322 may utilize the communication module 315 to communicate U/I resource allocation information to the system 360. The system 360 may then, for example, communicate information of the U/I resource allocation to a user in human-perceivable form.

The U/I resource 310 comprises a general processing module 345 that may, for example, along with aspects of the U/I resource management module 320, perform general processing activities involved with utilization of the U/I resource 310. For example, the processing module 345 may, for example, implement various aspects of the methods 100, 200 illustrated in FIGS. 1 and 2 (e.g., steps 170 and 270). For example the U/I resource module 320 and processing module 345 may utilize the communication module 315 to establish and maintain communication links for using the U/I resource 310 with the system 360. The processing module 345, during utilization of the U/I resource 310 may, for example, utilize the secure communication module 330 to encrypt and/or decrypt information communicated with the system 360. The processing module 345 may also, for example, translate information communicated between the U/I resource 310 and the system 360 into formats compatible with the respective entities.

The processing module 345, working in conjunction with the U/I resource management module 320 and the communication module 315, may perform various clean-up activities when use of the U/I resource 310 with the system 360 is complete. The various modules may, for example, implement various aspects of the methods 100, 200 illustrated in FIGS. 1 and 2 (e.g., steps 180 and 280) and discussed previously. For example and without limitation, the U/I resource management module 320 may utilize the communication module 315 to tear down various communication links previously formed for utilization of the U/I resource 310 with the system 360. The U/I resource management module 320 may also, for example, maintain a database to indicate that the U/I resource 310 is no longer allocated for use with the system 360.

The system 300 illustrated in FIG. 3 illustrates a portion of various aspects of the present invention. The system 300 is merely exemplary, and accordingly, the scope of various aspects of the present invention should not be limited by particular exemplary characteristics of the exemplary system 300.

FIGS. 7-10 provide exemplary illustrations of U/I resources in accordance with various aspects of the present invention.

Figure 7:
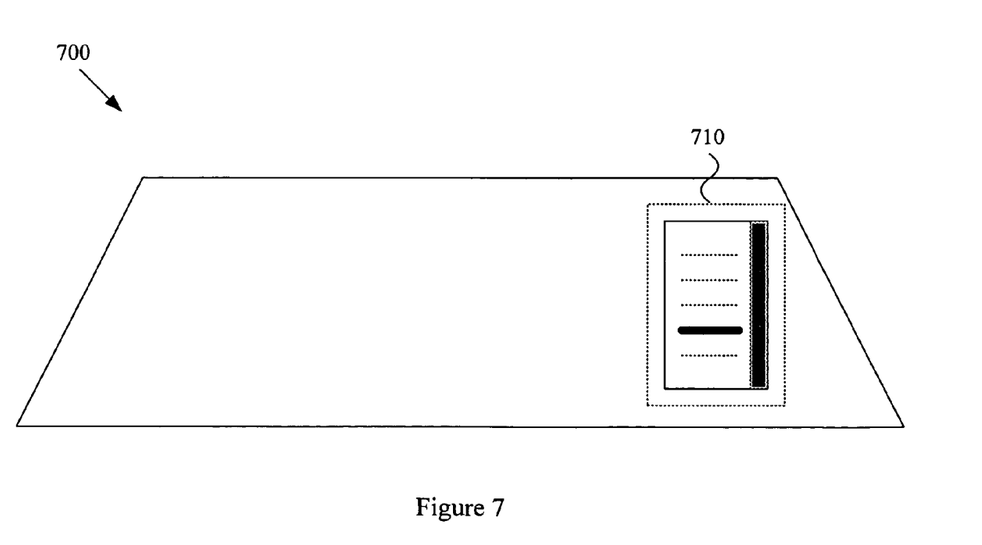
FIG. 7 illustrates a keyboard user interface resource in accordance with various aspects of the present invention.

FIG. 7 illustrates a keyboard user interface resource 700 in accordance with various aspects of the present invention. The keyboard U/I resource 700 may, for example, comprise a display 710 to indicate to the user which systems the keyboard U/I resource 700 is available for use with. Such a display 710 may, for example, correspond to at least a portion of the user output module 335 of the U/I resource 310 illustrated in FIG. 3. The keyboard U/I resource 700 may alternatively, for example, utilize a screen on a linked display to communicate information to the user.

A user may specify the system that the user desires to use the keyboard U/I resource 700 with. For example, a user may use arrow and select buttons on the keyboard U/I resource 700 to specify the desired system. The keyboard U/I resource 700 may, as shown in FIG. 3, utilize a touch-screen display 710 to indicate the system that the user desires to utilize the keyboard U/I resource 710 with. Such arrow buttons, select buttons, and touch-screen display 710 may, for example, correspond to at least a portion of the user input module 340 of the U/I resource 310 illustrated in FIG. 3.

The keyboard U/I resource 700 may, for example, comprise various structural components illustrated in the U/I resource 310 illustrated in FIG. 3, along with various other structure components. Various structural components may, for example, perform various operations discussed with regard to the methods 100, 200 and system 300 illustrated in FIGS. 1-3.

Figure 8:
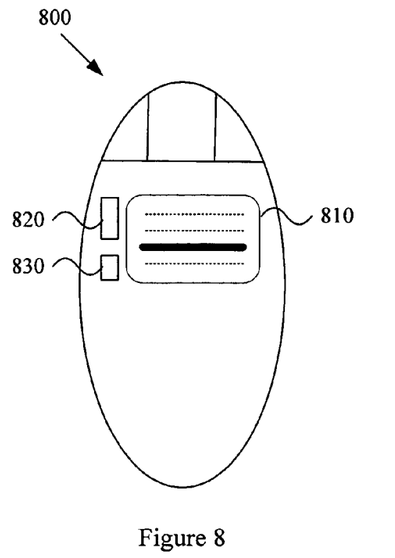
FIG. 8 illustrates a mouse user interface resource in accordance with various aspects of the present invention.

FIG. 8 illustrates a mouse U/I resource 800 in accordance with various aspects of the present invention. The mouse U/I resource 800 may comprise a display 810 to indicate to the user which systems the mouse U/I resource 800 is available for use with. Such a display 810 may, for example, correspond to at least a portion of the user output module 335 of the U/I resource 310 illustrated in FIG. 3. The mouse U/I resource 800 may alternatively, for example, utilize a screen on a linked display to communication information to the user.

A user may specify the system that the user desires to use the mouse U/I resource 800 with. For example, a user may use arrow 820 and select 830 buttons on the mouse U/I resource 800 to specify the desired system. Alternatively, for example, the display 810 may be a touch-screen that provides for the user to specify the desired system. Such arrow button 820, select button 830 and exemplary touch-screen may, for example, correspond to at least a portion of the user input module 340 of the U/I resource 310 illustrated in FIG. 3.

The mouse U/I resource 800 may, for example, comprise various structural components illustrated in the U/I resource 310 illustrated in FIG. 3, along with various other structure components. Various structural components may, for example, perform various operations discussed with regard to the methods 100, 200 and system 300 illustrated in FIGS. 1-3.

Figure 9:
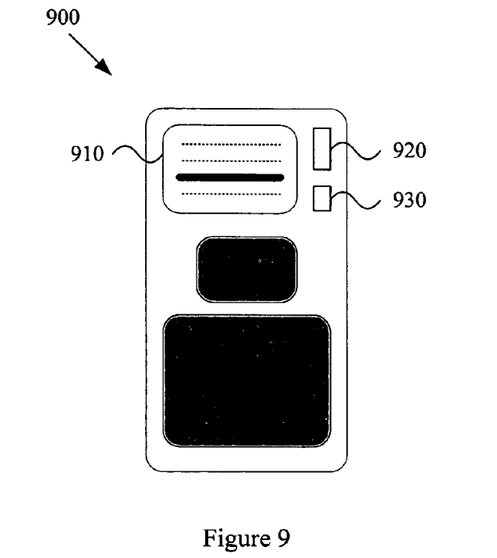
FIG. 9 illustrates a speaker user interface resource in accordance with various aspects of the present invention.

FIG. 9 illustrates a speaker U/I resource 900 in accordance with various aspects of the present invention. The speaker U/I resource 900 may comprise a display 910 to indicate to the user which systems the speaker U/I resource 900 is available for use with. Such a display 910 may, for example, correspond to at least a portion of the user output module 335 of the U/I resource 310 illustrated in FIG. 3. The speaker U/I resource 900 may alternatively, for example, utilize a screen on a linked display to communication information to the user.

A user may specify the system that the user desires to use the speaker U/I resource 900 with. For example, a user may use arrow 920 and select 930 buttons on the speaker U/I resource 900 to specify the desired system. Alternatively, for example, the display 910 may be a touch-screen that provides for the user to specify the desired system. Such arrow button 920, select button 930 and exemplary touch-screen may, for example, correspond to at least a portion of the user input module 340 of the U/I resource 310 illustrated in FIG. 3.

Figure 10:
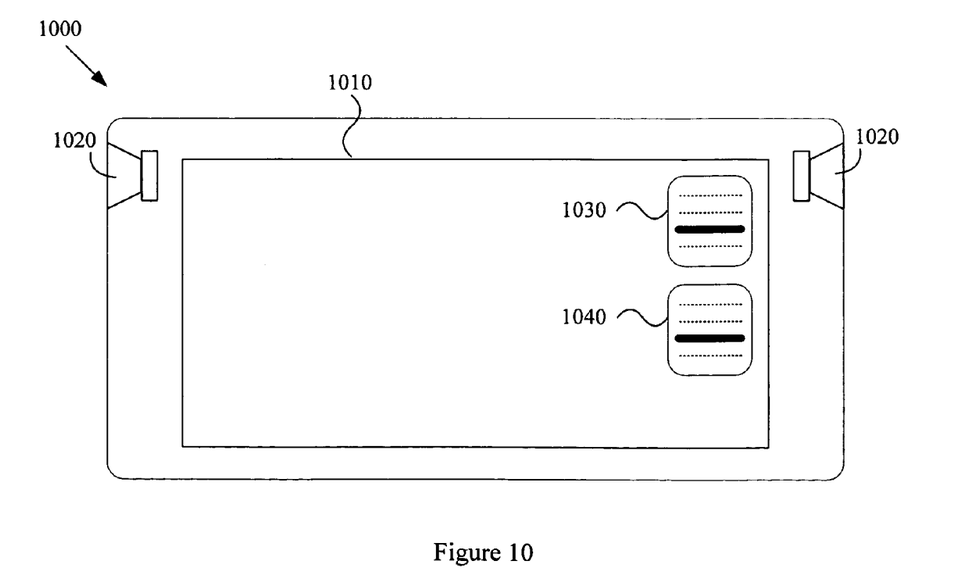
FIG. 10 illustrates an audio/video output user interface resource in accordance with various aspects of the present invention.

FIG. 10 illustrates an audio/video output U/I resource 1000 in accordance with various aspects of the present invention. The exemplary audio/video output U/I resource 1000 comprises a video output system 1010 and an audio output system 1020. The audio/video output U/I resource 1000 may comprise, for example, a first output 1030 on the video output system 1010 to indicate to the user which systems the video output system 1010 of the audio/video output U/I resource 1000 is available for use with. The audio/video output U/I resource 1000 may also comprise, for example, a second output 1040 on the video output system 1010 to indicate to the user which systems the audio output system 1020 of the audio/video output U/I resource 1000 is available for use with. Such split control displays may be advantageous, for example, in audio/video systems that may provide output for a plurality of sources. For example, a user may utilize the video output system 1010 to output video information corresponding to a movie and a word processing application, while utilizing the audio output system 1020 to output sound corresponding to the movie and not to the word processing application. Such outputs 1030, 1040 may, for example, correspond to at least a portion of the user output module 335 of the U/I resource 310 illustrated in FIG. 3.

A user may specify the system(s) that the user desires to use the audio/video output U/I resource 1000 with. For example, a user may use a remote control coupled to the audio/video output U/I resource 1000 to specify the desired system. Alternatively, for example, a user may use arrow and select buttons on the audio/video output U/I resource to specify the desired system(s). Such exemplary remote control, arrow button and select button may, for example, correspond to at least a portion of the user input module 340 of the U/I resource 310 illustrated in FIG. 3.

In various U/I resource configurations, a first U/I resource may perform U/I resource management functions for a second U/I resource. In such a configuration, referring back to FIG. 3, the U/I resource 310 may, for example, comprise a U/I resource interface module that communicatively couples a second U/I resource to the U/I resource 310.

Figure 11:
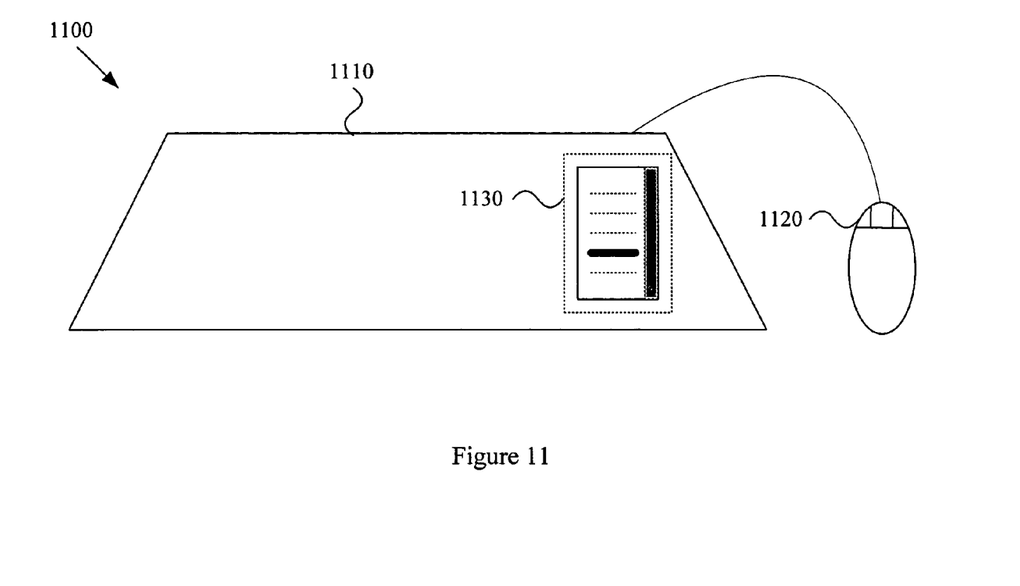
FIG. 11 illustrates an exemplary U/I resource proxy configuration in accordance with various aspects of the present invention.

FIG. 11 illustrates an exemplary keyboard/mouse U/I resource configuration 1100 in accordance with various aspects of the present invention. In one exemplary scenario, the keyboard U/I resource 1110 is communicatively coupled to a mouse U/I resource 1120. The keyboard U/I resource 1110 may, for example, manage the mouse U/I resource 1120.

A user may, for example, utilize the keyboard U/I resource 1110 and mouse U/I resource 1120 as a combined U/I resource. The user may, for example, use the touch-screen display 1130 of the keyboard U/I resource 1110 to specify that the keyboard U/I resource 1110 and the mouse U/I resource 1120 are to be used with a particular system. The keyboard U/I resource 1110 may then, for example, allocate the keyboard U/I resource 1110 and the mouse U/I resource 1120 for use with the specified system. The keyboard U/I resource 1110 may also, for example, serve as a communication conduit for information between the mouse U/I resource 1120 and the specified system. The keyboard U/I resource 1110 may further, for example, perform any signal processing necessary to adequately utilize the mouse U/I resource 1120 with the specified system.

The illustration in FIG. 11 is exemplary and should by no means limit the scope of various aspects of the present invention to the exemplary keyboard/mouse U/I resource configuration 1100. Various aspects of the present invention may comprise a large variety of user interface resources managing other user interface resources. For example and without limitation, a video display U/I resource may manage an audio speaker U/I resource, a DVD player U/I resource may manage a camera U/I resource, and a motion picture U/I resource may manage a microphone U/I resource.

In summary, aspects of the present invention provide a system and method for managing the allocation and utilization of user interface resources in a communication system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will comprise all embodiments falling within the scope of the appended claims.

What is claimed is:

1. A method for managing utilization of a user interface device with one or more computing systems, the method comprising:
 in the user interface device:
  establishing a wireless communication link with a computing system;
  determining that at least a portion of the user interface device may be used with the computing system as an interface between a user and the computing system, said determining based on a list of authorized devices maintained by the user interface device;
  communicating a signal indicating that at least a portion of the user interface device may be used with the computing system;
  receiving a request to allocate said at least said portion of the user interface device for use with the computing system based on the communicated signal; and
  allocating the requested said at least said portion of the user interface device for use with the computing system,
  wherein the user interface device is one or more of: a mouse, a keyboard, a scanner, a printer, a microphone, a speaker, a camera, and/or a video display.

2. A method for managing utilization of a user interface device with one or more computing systems, the method comprising:
 in the user interface device:
  establishing a wireless communication link with a computing system;
  determining that at least a portion of the user interface device may be used with the computing system as an interface between a user and the computing system, said determining based on a list of authorized devices maintained by the user interface device;
  communicating a signal indicating that at least a portion of the user interface device may be used with the computing system;
  receiving a request to allocate said at least said portion of the user interface device for use with the computing system based on the communicated signal; and
  allocating the requested said at least said portion of the user interface device for use with the computing system.

3. The method of claim 2, comprising establishing a second communication link between the user interface device and a second computing system, and wherein:
   said determining comprises determining that at least a portion of the user interface device may be used with both the computing system and the second computing system; and
   said communicating comprises communicating that at least a portion of the user interface device may be used with the computing system and the second computing system.

4. The method of claim 2, wherein said determining comprises determining whether using at least a portion of the user interface device with the computing system is authorized.

5. The method of claim 2, wherein said determining comprises determining secure communication capability of at least one of the computing system and the user interface device.

6. The method of claim 2, comprising providing an interface between a user and the computing system, said providing of said interface comprising one or both of encrypting and/or decrypting information communicated between the computing system and the user interface device.

7. The method of claim 2, wherein said communicating comprises communicating, on a display of the user interface device, that at least a portion of the user interface device may be used with the computing system.

8. The method of claim 2, wherein said receiving comprises receiving, from a user via a user input feature of the user interface device, a request to allocate at least a portion of the user interface device for use with the computing system.

9. The method of claim 2, comprising communicating to a user, via a user output feature of the user interface device, information related to the allocation of at least a portion of the user interface device for use with the computing system.

10. The method of claim 2, comprising communicating to the computing system, via the wireless communication link, information related to the allocation of at least a portion of the user interface device for use with the computing system.

11. The method of claim 2, comprising communicating to the computing system and to a second computing system information related to the allocation of respective portions of the user interface device for use with the computing system and the second computing system.

12. The method of claim 2, wherein said allocating comprises allocating at least a portion of the user interface device and at least a portion of a second user interface device, separate from the user interface device, for use with the computing system.

13. A system for managing utilization of a user interface device with one or more computing systems, the system comprising:
   one or more processors for use within the user interface device, said one or more processors being operable to establish a wireless communication link with a computing system;
   said one or more processors being operable to determine that at least a portion of the user interface device may be used with the computing system as an interface between a user and the computing system, said determining based on a list of authorized devices maintained by the user interface device;
   said one or more processors being operable to communicate a signal indicating that at least a portion of the user interface device may be used with the computing system;
   said one or more processors being operable to receive a request to allocate said at least said portion of the user interface device for use with the computing system based on the communicated signal; and
   said one or more processors being operable to allocate the requested said at least said portion of the user interface device for use with the computing system.

14. The system of claim 13, wherein said one or more processors are operable to establish a second communication link between the user interface device and a second computing system, and wherein:
   said one or more processors are operable to determine that at least a portion of the user interface device may be used with both the computing system and the second computing system; and
   said one or more processors are operable to communicate that at least a portion of the user interface device may be used with the computing system and the second computing system.

15. The system of claim 13, wherein said one or more processors are operable to determine whether using at least a portion of the user interface device with the computing system is authorized.

16. The system of claim 13, wherein said one or more processors are operable to determine secure communication capability of at least one of the computing system and the user interface device.

17. The system of claim 13, wherein said one or more processors are operable to provide an interface between a user and the computing system, said providing of said interface comprising one or both of encrypting and/or decrypting information communicated between the computing system and the user interface device.

18. The system of claim 13, wherein said one or more processors are operable to communicate, on a display of the user interface device, that at least a portion of the user interface device may be used with the computing system.

19. The system of claim 13, wherein said one or more processors are operable to receive, from a user via a user input feature of the user interface device, a request to allocate at least a portion of the user interface device for use with the computing system.

20. The system of claim 13, wherein said one or more processors are operable to communicate to a user, via a user output feature of the user interface device, information related to the allocation of at least a portion of the user interface device for use with the computing system.

21. The system of claim 13, wherein said one or more processors are operable to communicate to the computing system, via the wireless communication link, information related to the allocation of at least a portion of the user interface device for use with the computing system.

22. The system of claim 13, wherein said one or more processors are operable to communicate to the computing system and to a second computing system information related to the allocation of respective portions of the user interface device for use with the computing system and the second computing system.

23. The system of claim 13, wherein said one or more processors are operable to allocate at least a portion of the user interface device and at least a portion of a second user interface device, separate from the user interface device, for use with the computing system.

* * * * *